United States Patent
Xia et al.

(10) Patent No.: US 11,570,277 B2
(45) Date of Patent: Jan. 31, 2023

(54) CONFIGURATION METHOD AND APPARATUS

(71) Applicant: HUAWEI TECHNOLOGIES CO., LTD., Shenzhen (CN)

(72) Inventors: Haitao Xia, Beijing (CN); Xu Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/877,322

(22) Filed: May 18, 2020

(65) Prior Publication Data

US 2020/0329119 A1    Oct. 15, 2020

Related U.S. Application Data

(63) Continuation of application No. PCT/CN2018/116348, filed on Nov. 20, 2018.

(30) Foreign Application Priority Data

Nov. 21, 2017   (CN) .......................... 201711167051.3

(51) Int. Cl.
 *H04L 67/63*     (2022.01)
 *H04L 41/0813*   (2022.01)
 *H04L 61/50*     (2022.01)

(52) U.S. Cl.
 CPC .......... *H04L 67/63* (2022.05); *H04L 41/0813* (2013.01); *H04L 61/50* (2022.05)

(58) Field of Classification Search
 CPC ... H04L 67/327; H04L 41/0813; H04L 61/20; H04L 67/63; H04L 61/50
 See application file for complete search history.

(56) References Cited

U.S. PATENT DOCUMENTS

2014/0247751 A1* 9/2014 Sonoda ............... H04L 41/5064
                                                    370/254
2015/0365819 A1   12/2015 Zhu et al.
                  (Continued)

FOREIGN PATENT DOCUMENTS

CN       103430516 A    12/2013
CN       106302574 A     1/2017
                (Continued)

OTHER PUBLICATIONS

S5-175180 Intel,"Paper to discuss edge computing management issues",3GPP TSG SA WG5 (Telecom Management) Meeting #115,Oct. 16-20, 2017, Busan, Korea,total 4 pages.
(Continued)

*Primary Examiner* — Jonathan A Bui
*Assistant Examiner* — Zonghua Du
(74) *Attorney, Agent, or Firm* — Stein IP, LLC

(57) ABSTRACT

A configuration method and apparatus which resolves a problem that a forwarding delay of a traffic flow or packet is relatively long. The configuration method includes: a mobile edge ME platform manager determining a network forwarding path NFP from an instantiated first MEC application to a first destination application, where the NFP is used to indicate a forwarding path of a traffic flow or packet that is sent by the first MEC application to the first destination application; the ME platform manager sending an NFP creation request to a virtualized infrastructure manager VIM, to request the VIM to create the NFP determined by the ME platform manager; and the ME platform manager associating the NFP created by the VIM with a first traffic flow rule configured for the first MEC application.

22 Claims, 10 Drawing Sheets

(56) References Cited

U.S. PATENT DOCUMENTS

| | | | |
|---|---|---|---|
| 2016/0337172 A1* | 11/2016 | Yu | H04L 67/34 |
| 2016/0352815 A1* | 12/2016 | Mozolewski | G06F 9/5083 |
| 2017/0005950 A1* | 1/2017 | Yamato | H04L 45/02 |
| 2017/0118128 A1* | 4/2017 | Vishnoi | H04L 41/12 |
| 2017/0142591 A1 | 5/2017 | Vrzic | |
| 2017/0223756 A1* | 8/2017 | Sebastian | H04L 12/28 |
| 2018/0159765 A1 | 6/2018 | Shi et al. | |
| 2018/0198715 A1* | 7/2018 | Shmilovici | H04L 45/74 |
| 2018/0263039 A1* | 9/2018 | Fang | H04W 72/0493 |
| 2020/0028938 A1* | 1/2020 | Rasanen | H04L 47/2441 |
| 2021/0176327 A1* | 6/2021 | Soliman | H04M 15/66 |

FOREIGN PATENT DOCUMENTS

| | | |
|---|---|---|
| CN | 106921977 A | 7/2017 |
| CN | 107211320 A | 9/2017 |
| CN | 107251514 A | 10/2017 |
| CN | 107305502 A | 10/2017 |
| WO | 2017020203 A1 | 2/2017 |

OTHER PUBLICATIONS

ETSI GS MEC 010-2 V1.1.1 (Jul. 2017),Mobile Edge Computing (MEC);Mobile Edge Management;Part 2: Application lifecycle, rules and requirements management,total 48 pages.

XP014309582 Nokia Germany,"MEC017 Enhancing Issue#9 Managing traffic redirection MEC(17)000587r1", dated Nov. 20, 2017,total 7 pages.

XP014303284 Draft ETSI GR MEC 017 V0.7.0 (Nov. 2017),Mobile Edge Computing (MEC);Deployment of Mobile Edge Computing in an NFV environment,total 30 pages.

XP014311581 Draft ETSI GS MEC 010-2 V1.0.1 (Apr. 2017),Mobile Edge Computing (MEC);Application lifecycle, rules and repuirements management,total 46 pages.

XP055568743 ETSI GS MEC 003 V1.1.1 (Mar. 2016),Mobile Edge Computing (MEC);Framework and Reference Architecture,total 18 pages.

XP014253216 ETSI GS NFV IFA 010 V0.4.1 (Jun. 2015),Network Functions Virtualisation (NFV)Management and Orchestration Functional Repuirements Specification,total 34 pages.

* cited by examiner

CONFIGURATION METHOD AND APPARATUS

CROSS-REFERENCE TO RELATED APPLICATIONS

This application is a continuation of International Application No. PCT/CN2018/116348, filed on Nov. 20, 2018, which claims priority to Chinese Patent Application No. 201711167051.3, filed on Nov. 21, 2017, The disclosures of the aforementioned applications are hereby incorporated by reference in their entireties.

TECHNICAL FIELD

Aspects of this application relate to the field of information technologies, and in particular, to a configuration method and apparatus.

BACKGROUND

In mobile edge computing (MEC), a radio access network is used to provide a required information technology (IT) service and cloud computing function for a telecommunications user close to the radio access network, to create a carrier-class service environment with high performance, low latency, and high bandwidth. This accelerates downloading of content, services, and applications in a network and allows a consumer to have uninterrupted high-quality network experience.

A data packet of a MEC application includes a template file that is referred to as an application descriptor (AppD). The AppD describes information such as a requirement of the application for virtual compute, storage, and network resources, a dependent service, a feature, a DNS rule, and a traffic flow rule. A mobile edge (ME) management system may perform lifecycle management on the MEC application based on the information in the AppD, for example, configuring a resource for the MEC application to create an application instance (which may be also referred to as instantiation of the application), configuring a traffic flow rule, or deleting an application instance. The traffic flow rule of the MEC application is configured after the resource of the MEC application is configured. When a ME platform uses the traffic flow rule to forward a traffic flow or packet of an instance of the MEC application, a ME platform manager needs to create a forwarding route for the traffic flow or packet at an infrastructure layer as required according to the traffic flow rule, and then forwards the traffic flow or packet to a destination network node or a destination application hop by hop.

In the prior art, a forwarding delay of a traffic flow or packet is relatively long.

SUMMARY

Aspects of this application provides a configuration method and apparatus, to resolve a prior-art problem that a forwarding delay of a traffic flow or packet is relatively long.

According to a first aspect, this application provides a configuration method, including the following steps. A mobile edge ME platform manager determines a network forwarding path NFP from an instantiated first MEC application to a first destination application, where the NFP is used to indicate a forwarding path of a traffic flow or packet that is sent by the first MEC application to the first destination application; the ME platform manager sends an NFP creation request to a virtualized infrastructure manager (VIM), to request the VIM to create the NFP determined by the ME platform manager, where the NFP created by the VIM is a transmission path resource formed by assembling network resources used to forward a traffic flow or packet, and is a special network resource; and the ME platform manager associates the NFP created by the VIM with a first traffic flow rule configured for the first MEC application. For example, the ME platform manager may associate an identifier of the created NFP with identification information of the first traffic flow rule.

In the foregoing technical solution, the ME platform manager requests the VIM to assemble the network resources used to transmit the traffic flow or packet of the first MEC application to form the NFP, and associates the created NFP with the traffic flow rule of the first MEC application. After an association relationship is configured on the ME platform, the ME platform may directly select, according to a used traffic flow rule, an NFP associated with the used traffic flow rule to transmit the traffic flow or packet of the first MEC application. Compared with the prior art in which a ME platform needs to determine, hop by hop according to a traffic flow rule, an address of a next-hop network function node for forwarding when actually forwarding a traffic flow or packet of a first MEC application, the foregoing technical solution can effectively avoid additional processing delay overheads for creating the forwarding path during forwarding of the traffic flow or packet of the first MEC application, and ensure a requirement of a MEC application for low-latency or real-time transmission.

In some implementations of the first aspect, the ME platform manager further sends a configuration request to a ME platform that manages the first MEC application, to request the ME platform to perform configuration for an instance of the first MEC application. The configuration may be specifically associating the created NFP with the first traffic flow rule of the first MEC application. In the foregoing technical solution, when the ME platform uses the traffic flow rule to forward the traffic flow or packet of the first MEC application, the created network forwarding path NFP may be used to directly implement a next hop of the packet, thereby reducing a forwarding delay of the traffic flow or packet of the first MEC application.

In some implementations of the first aspect, a manner used by the ME platform manager to determine the NFP from the first MEC application to the first destination application may be: determining, by the ME platform manager, a host address of the first destination application according to the first traffic flow rule; and determining, by the ME platform manager, the NFP based on a host address of the first MEC application and the host address of the first destination application. In the foregoing technical solution, the ME platform manager may determine the host address of the first destination application according to the traffic flow rule, and determine the network forwarding path NFP based on the host address of the first MEC application and the host address of the first destination application. In this way, the traffic flow or packet sent by the first MEC application is transmitted to the first destination application by using a network function node indicated by the NFP. For an algorithm of determining the NFP, refer to various technical means in the prior art. Details are not described in this embodiment of this application.

In some implementations of the first aspect, the NFP includes a sequence, formed based on a sequence of hops during forwarding of the packet, of connection points that are of a network function node and through which the traffic flow or packet of the first MEC application passes to reach the first destination application. Optionally, the connection point in the sequence of connection points included in the NFP is a connection point of an available network function node in a management domain of the ME platform manager. In the foregoing technical solution, the ME platform manager may generate the NFP based on the connection point that is of the network function node and through which the traffic flow or packet of the first MEC application passes to reach the first destination application, and then request the VIM to generate the NFP, so that the ME platform uses the NFP to forward, according to the first traffic flow rule, the traffic flow or packet from the first MEC application to the first destination application. This can be implemented easily and efficiently.

In some implementations of the first aspect, the ME platform manager determines that a host address of an instantiated second MEC application is the same as the host address of the first MEC application, and that a host address, in a second traffic flow rule configured for the second MEC application, of a second destination application is the same as the host address of the first destination application. The ME platform manager associates the second traffic flow rule with the created NFP. In the foregoing technical solution, the created NFP may be associated with traffic flow rules of a plurality of MEC applications. This improves utilization of the NFP and reduces overheads for determining the NFP by the ME platform manager and creating a resource for the NFP by the VIM.

In some implementations of the first aspect, the ME platform manager checks whether there is a MEC application instance associated with the created NFP. The MEC application instance associated with the NFP is a MEC application instance of which traffic flow rule MEC application is associated with the NFP, and the ME platform may use the network resource provided by the NFP to forward a traffic flow or packet indicated by the traffic flow rule. If there is no MEC application instance associated with the NFP, the ME platform manager instructs the VIM to release the NFP. Optionally, if there is no MEC application instance associated with the NFP, the ME platform manager further instructs the ME platform to delete the NFP stored on the ME platform. Optionally, if there is no MEC application instance associated with the NFP, the ME platform manager further deletes the NFP stored in the ME platform manager. In the foregoing technical solution, as the MEC application instance associated with the NFP is terminated, the ME platform manager may instruct the VIM to release the NFP, to reduce overheads for maintaining the NFP by the VIM.

In some implementations of the first aspect, the ME platform manager may further obtain the preset first traffic flow rule from an application descriptor of the first MEC application, where the preset first traffic flow rule includes a filter criterion and a forwarding interface description, and the forwarding interface description includes a forwarding interface indication; the ME platform manager determines an address resource that is allocated by the VIM to an interface indicated by the forwarding interface indication; and the ME platform manager determines a to-be-configured first traffic flow rule based on the address resource and the preset first traffic flow rule, where the forwarding interface indication in the to-be-configured first traffic flow rule is associated with the address resource. In the foregoing technical solution, an address of a forwarding interface may not be set in the application descriptor of the MEC application, but instead indication information (for example, an application external connection point (AppExtCp)) of the forwarding interface is added. After the VIM allocates an address resource to the forwarding interface, the allocated address resource is associated with the forwarding interface indication/forwarding interface description/traffic flow rule. For example, an allocated MAC address and/or IP address are/is associated with the traffic flow rule based on information about a specified interface type, to set an address of an interface used for forwarding a traffic flow or packet indicated by a filter criterion in the traffic flow rule. The foregoing method is not only applicable to a scenario in which an address resource of an interface of the MEC application is dynamically allocated, but also avoids low address resource utilization resulting from configuration of a fixed address for the MEC application.

In some implementations of the first aspect, after the ME platform manager determines the to-be-configured first traffic flow rule, the ME platform manager sends a configuration request to the ME platform, where the configuration request includes the to-be-configured first traffic flow rule and is used to request the ME platform to configure the to-be-configured first traffic flow rule and forward, according to the configured first traffic flow rule, a packet indicated by the filter criterion to an interface that is of the first MEC application and that uses the address resource.

In some implementations of the first aspect, after the address resource that is allocated to the interface indicated by the forwarding interface indication is changed, the ME platform manager determines an updated first traffic flow rule, where the forwarding interface indication in the updated first traffic flow rule is associated with a changed address resource; and the ME platform manager sends a reconfiguration request to the ME platform, where the reconfiguration request includes the updated first traffic flow rule and is used to request the ME platform to configure the updated first traffic flow rule and forward, according to the updated first traffic flow rule, the packet indicated by the filter criterion to an interface that is of the first MEC application and that uses an changed address resource. In the foregoing technical solution, after the address resource of the interface of the MEC application is changed, the ME platform manager updates the traffic flow rule and requests the ME platform to reconfigure an updated traffic flow rule, so that the traffic flow or packet indicated by the filter criterion is forwarded to an interface of a MEC application instance, where an address of the interface may be dynamically changed.

According to a second aspect, this application provides a configuration method, including the following steps. A ME platform manager obtains a preset traffic flow rule from an application descriptor of a MEC application, where the preset traffic flow rule includes a filter criterion and a forwarding interface description, and the forwarding interface description includes a forwarding interface indication. The forwarding interface indication may be an AppExtCp field in the application descriptor, and is used to indicate a destination interface to which a traffic flow or packet defined by the filter criterion in a traffic flow rule is forwarded. The ME platform manager determines an address resource that is allocated by a VIM to an interface indicated by the forwarding interface indication; and the ME platform manager determines a to-be-configured traffic flow rule based on the address resource and the preset traffic flow rule, where the forwarding interface indication in the to-be-configured traffic flow rule is associated with the address resource. In the foregoing technical solution, an address of a forwarding interface may not be set in the application descriptor of the MEC application, but instead indication information (for example, an AppExtCp) of the forwarding interface is added. After the VIM allocates an address resource to the forwarding interface, the allocated address resource is associated with the forwarding interface indication/forwarding interface description/traffic flow rule. For example, an allocated MAC address and/or IP address are/is associated with the traffic flow rule based on information about a specified interface type, to set an address of an interface used for forwarding a traffic flow or packet indicated by a filter criterion in the traffic flow rule. The foregoing method is not only applicable to a scenario in which an address resource of an interface of the MEC application is dynamically allocated, but also avoids low address resource utilization resulting from configuration of a fixed address for the MEC application.

In some implementations of the second aspect, the ME platform manager further sends a configuration request to a ME platform that manages the MEC application, where the configuration request includes the to-be-configured traffic flow rule and is used to request the ME platform to configure the to-be-configured traffic flow rule and forward, according to the configured traffic flow rule, a packet indicated by the filter criterion to an interface that is of the MEC application and that uses the address resource. Optionally, the ME platform performs configuration for an instance of the MEC application, and configures the interface that is of the MEC application instance and that uses the address resource to receive the packet indicated by the filter criterion. In the foregoing technical solution, the to-be-configured traffic flow rule is configured for the MEC application instance, so that the ME platform forwards a traffic flow indicated by the filter criterion or the packet indicated by the filter criterion to an interface of the MEC application instance, where an address of the interface may be dynamically allocated.

In some implementations of the second aspect, after the address resource that is allocated to the interface indicated by the forwarding interface indication is changed, the ME platform manager determines an updated traffic flow rule, where the forwarding interface indication in the updated traffic flow rule is associated with a changed address resource; and the ME platform manager sends a reconfiguration request to the ME platform, where the reconfiguration request includes the updated traffic flow rule and is used to request the ME platform to configure the updated traffic flow rule and forward, according to the updated traffic flow rule, the packet indicated by the filter criterion to an interface that is of the MEC application and that uses the changed address resource. In the foregoing technical solution, after the address resource of the interface of the MEC application is changed, the ME platform manager updates the traffic flow rule and requests the ME platform to reconfigure an updated traffic flow rule, so that the traffic flow or packet indicated by the filter criterion is forwarded to an interface of the MEC application instance, where an address of the interface may be dynamically changed.

According to a third aspect, this application provides a resource creation method, including the following steps. A VIM receives an NFP creation request sent by a ME platform manager, where the NFP creation request includes an NFP generated by the ME platform manager; and the VM creates the NFP and returns an NFP creation result to the ME platform manager. In the foregoing technical solution, the VIM may assemble a network resource used for forwarding a traffic flow or packet to form a transmission path resource, so that a ME platform may directly select, according to a used traffic flow rule, an NFP, in other words, a network resource, associated with the used traffic flow rule to transmit a traffic flow or packet of a first MEC application, to reduce time consumed in transmitting the traffic flow or packet.

According to a fourth aspect, this application provides a configuration method, including the following steps. A ME platform receives a configuration request sent by a ME platform manager, where the configuration request includes an identifier of a created NFP and an identifier of a traffic flow rule of a MEC application; and the ME platform performs configuration for an instance of the MEC application and associates the identifier of the NFP with the identifier of the traffic flow rule. In the foregoing technical solution, the ME platform may associate the traffic flow rule of the MEC application to an NFP resource, so that the ME platform may directly select, according to a used traffic flow rule, an NFP, in other words, a network resource, associated with the used traffic flow rule to transmit a traffic flow or packet of a first MEC application, to reduce time consumed in transmitting the traffic flow or packet.

According to a fifth aspect, this application provides a configuration apparatus, and the configuration apparatus is configured to perform the method in the first, second, or fourth aspect, or any possible implementation of any one of the first, second, or fourth aspect. According to a fifth aspect, a configuration apparatus is provided, and the configuration apparatus is configured to perform the method in the first aspect, second aspect, or fourth aspect, or the method in any possible implementation of any one of the first aspect, second aspect, or fourth aspect.

According to a sixth aspect, this application provides a resource creation apparatus, and the apparatus is configured to perform the method in the third aspect. Specifically, the apparatus includes a module configured to perform the method in the third aspect.

According to a seventh aspect, an embodiment of this application provides a communications device, where the communications device includes a processor, a memory, and a communications interface, the communications interface is configured to communicate with another communications apparatus, the memory is configured to store a computer instruction, and the processor is configured to execute the computer instruction to perform the method in any one of the first to the fourth aspects or any possible implementation of any one of the first to the fourth aspects when executing the computer instruction.

According to an eighth aspect, this application provides a computer-readable storage medium, where the computer-readable storage medium stores a computer instruction, and when the instruction is run on a computer, the computer is enabled to perform the method in any one of the first to the fourth aspects or any possible implementation of any one of the first to the fourth aspects.

According to a ninth aspect, this application provides a computer program product, and when the computer program product is run on a computer, the computer is enabled to perform the method in any one of the first to the fourth aspects or any possible implementation of any one of the first to the fourth aspects.

In this application, based on the implementations provided in the foregoing aspects, the implementations may be further combined to provide more implementations.

DESCRIPTION OF EMBODIMENTS

To make the objectives, technical solutions, and advantages of this application clearer, the following further describes this application in detail with reference to the accompanying drawings.

Aspects of this application provide a configuration method and apparatus, to resolve a prior-art problem that a forwarding delay of a traffic flow or packet is relatively long. The method and the apparatus are based on a same inventive concept. Because problem-solving principles of the method and the apparatus are similar, mutual reference may be made between implementations of the apparatus and the method. Repeated descriptions are omitted.

In this application, "a plurality of" refers to two or more. In addition, in the descriptions of this application, terms such as "first" and "second" are merely used for the purpose of distinguishing, and shall not be understood as an indication or implication of relative importance or an indication or implication of an order.

It should be understood that technical solutions in the embodiments of this application may be applied to various mobile communications systems, for example, a 5th generation (5G) new radio access technology (5G NR) system, a long term evolution (LTE) system, an LTE frequency division duplex (FDD) system, LTE time division duplex (TDD), a code division multiple access (CDMA) system, a wideband code division multiple access (WCDMA) system, a global system for mobile communications (GSM), a general packet radio service (GPRS), a universal mobile telecommunications system (UMTS), a worldwide interoperability for microwave access (WiMAX) communications system, and the like.

Figure 1:
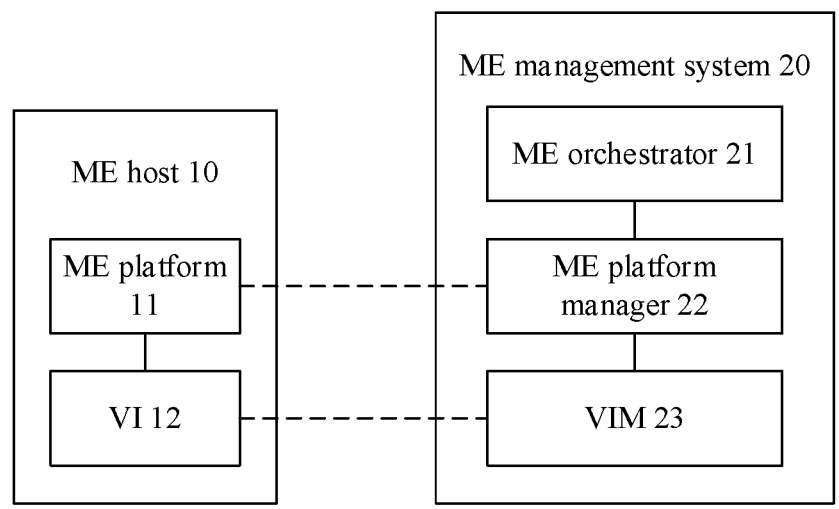
FIG. 1 is a schematic architectural diagram of mobile edge computing according to at least one embodiment of this application.

FIG. 1 shows a reference architecture of mobile edge computing (mobile edge computing, MEC). The reference architecture includes a ME host 10 and a ME management system 20.

The ME host 10 includes a ME platform 11 and a virtualized infrastructure (virtualized infrastructure, VI) 12. The virtualized infrastructure 12 provides virtualized compute, storage, and network resources for a MEC application, and the MEC application is deployed on the ME host 10 in a form of a virtual machine or a container. The virtualized infrastructure 12 includes a data plane, and the data plane executes a traffic flow rule from the ME platform 11 and completes a packet routing function. The ME platform 11 is further deployed on the ME host 10 and includes some common services, such as a terminal location service, a radio network information service, a domain name system (domain name system, DNS) server, or a DNS proxy service. The MEC application may use these common services. A service registration function of the ME platform 11 provides the MEC application with a capability of discovering and using a ME service. A traffic flow rule service means receiving a traffic flow rule from the ME management system 20 and delivers the traffic flow rule to the data plane. A DNS service means receiving, from the ME management system 20, a mapping rule between a domain name and an IP address.

The ME management system 20 includes a mobile edge (ME) orchestrator (MEO) 21, a ME platform manager (MEPM) 22, a virtualized infrastructure manager (VIM) 23, and the like. The ME orchestrator 21 maintains an overall view of all ME hosts, available resources, and available ME services in the ME system, and triggers instantiation and termination of an application. The ME platform manager 22 is configured to manage the ME platform, a lifecycle of the MEC application, and a traffic flow rule and a DNS rule of the application. The virtualized infrastructure manager 23 manages a virtualized resource required by the MEC application.

Figure 2:
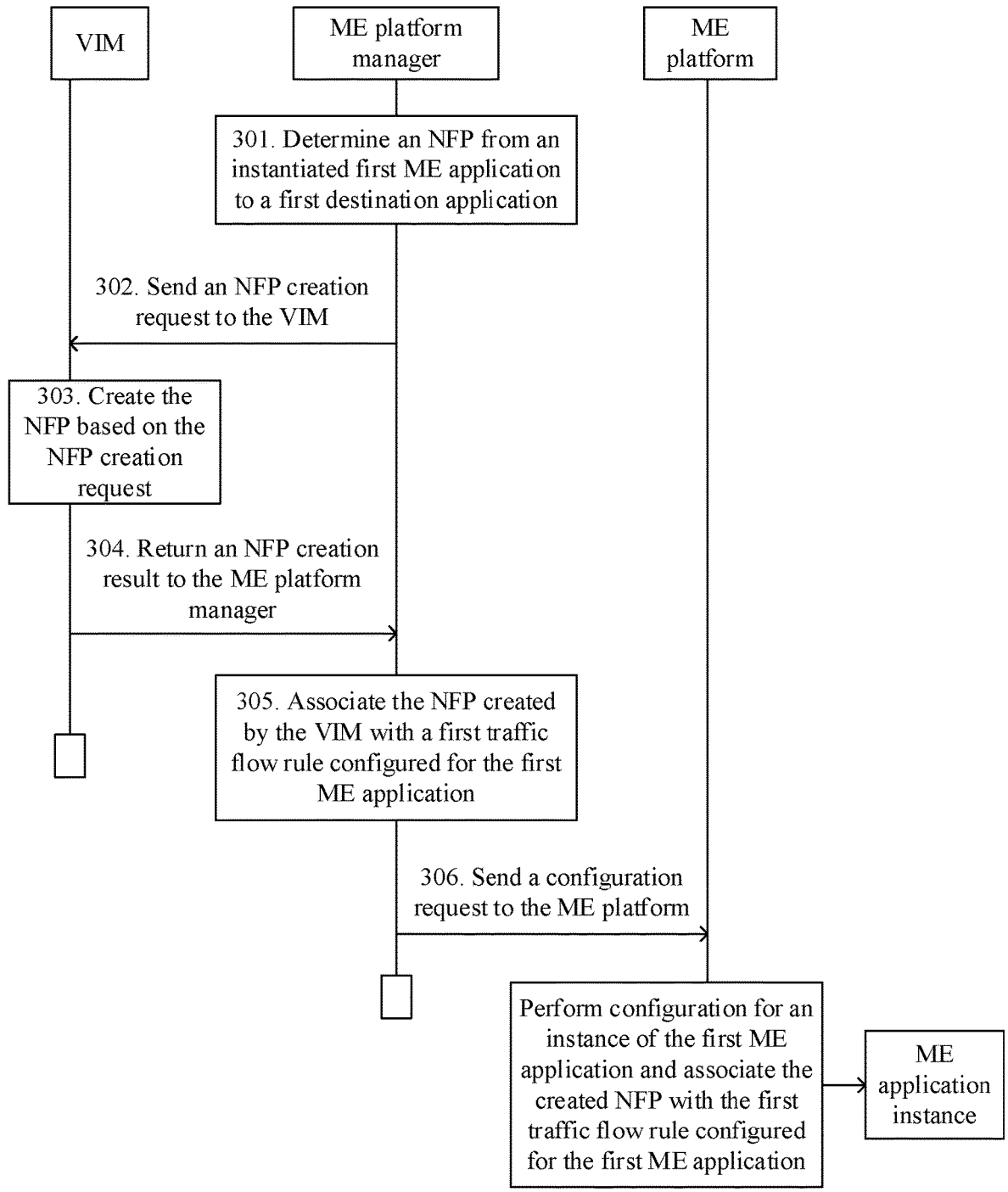
FIG. 2 to FIG. 5 and FIG. 7 and FIG. 8 are schematic flowcharts of configuration methods according to at least one embodiment of this application.

FIG. 2 is a configuration method according to an embodiment of this application, and the method includes the following steps:

Step 301: A ME platform manager determines a network forwarding path (network forwarding path, NFP) from an instantiated first MEC application to a first destination application. The NFP is used to indicate a forwarding path of a traffic flow or packet that is sent by the first MEC application to the first destination application. Step 301 is performed after the first MEC application is instantiated (that is, after a VIM allocates a virtual resource to the first MEC application). Optionally, step 301 is performed after the first MEC application is instantiated and a ME platform configures a traffic flow rule for an instance of the first MEC application. For processes of instantiating the first MEC application and configuring the traffic flow rule, refer to various possible implementations in the prior art. Details are not described in this embodiment of this application.

Step 302: The ME platform manager sends an NFP creation request to the virtualized infrastructure manager VIM, where the NFP creation request is used to request the VIM to create the NFP.

Step 303: The VIM receives the NFP creation request, and creates the NFP based on the NFP request. The NFP may be a transmission path resource formed by assembling network resources used to forward a traffic flow or packet, and is a special network resource.

Step 304: The VIM returns an NFP creation result to the ME platform manager, where the NFP creation result may be an identifier of the created NFP.

Step 305: The ME platform manager associates the NFP created by the VIM with a first traffic flow rule configured for the first MEC application. The association between the NFP and the first traffic flow rule may be implemented in a plurality of manners. For example, the ME platform manager may associate the identifier of the created NFP with identification information of the first traffic flow rule. For another example, the ME platform manager may add the identifier of the created NFP to the first traffic flow rule.

In the foregoing technical solution, the ME platform manager requests the VIM to assemble the network resources used to transmit the traffic flow or packet of the first MEC application to form the NFP, and associates the created NFP with the traffic flow rule of the first MEC application. After the association relationship is configured on the ME platform, the ME platform may directly select, according to a used traffic flow rule, an NFP associated with the used traffic flow rule to transmit the traffic flow or packet of the first MEC application. Compared with the prior art in which a ME platform needs to determine, hop by hop according to a traffic flow rule, an address of a next-hop network function node for forwarding when actually forwarding a traffic flow or packet of a first MEC application, the foregoing technical solution can effectively avoid additional processing delay overheads for creating the forwarding path during forwarding of the traffic flow or packet of the first MEC application, and ensure a requirement of a MEC application for low-latency or real-time transmission.

It should be understood that a plurality of traffic flow rules may be configured for the instance of the first MEC application, and NFPs determined by the ME platform manager based on different traffic flow rules of the first MEC application may be different. The ME platform manager may associate the plurality of traffic flow rules with NFPs corresponding to the plurality of traffic flow rules.

In an optional manner, still referring to FIG. 2, after step 305, the method further includes the following step:

Step 306: The ME platform manager sends a configuration request to the ME platform that manages the first MEC application, to request the ME platform to perform configuration for the instance of the first MEC application, where the configuration may be specifically associating the created NFP with the first traffic flow rule configured for the first MEC application.

In the foregoing technical solution, when the ME platform uses the traffic flow rule to forward the traffic flow or packet of the first MEC application, the created network forwarding path NFP may be used directly to implement a next hop of the packet, thereby reducing a forwarding delay of the traffic flow or packet of the first MEC application.

Figure 3:
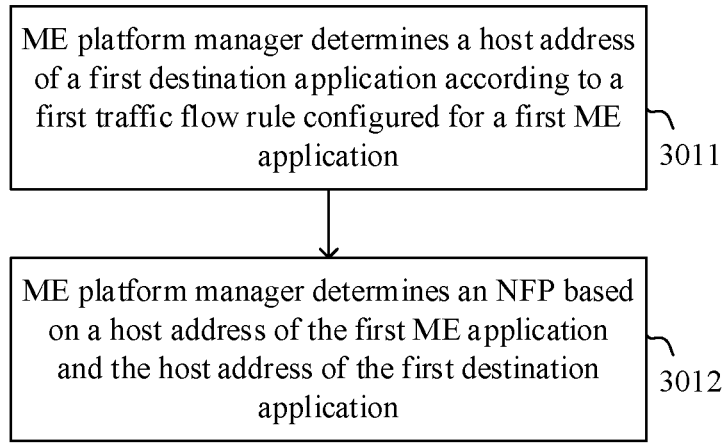

In an optional manner, referring to FIG. 3, implementation of step 301 may include the following steps:

Step 3011: The ME platform manager determines a host address of the first destination application according to the first traffic flow rule configured for the first MEC application. In some embodiments, the ME platform manager may read an application descriptor of the first MEC application from a ME orchestrator, and obtain the first traffic flow rule from the application descriptor. In this embodiment of this application, a traffic flow rule in the application descriptor may also be referred to as a preset traffic flow rule. The preset first traffic flow rule includes the host address of the first destination application. In some other embodiments, the ME platform manager stores the first traffic flow rule configured for the first MEC application, and the ME platform may read the host address of the first destination application from the configured first traffic flow rule.

Step 3012: The ME platform manager determines the NFP based on a host address of the first MEC application and the host address of the first destination application. A type of the host address of the first MEC application and a type of the host address of the first destination application may be an IP address, a MAC address, a tunnel connection identifier, or the like.

In the foregoing technical solution, the ME platform manager may determine the host address of the first destination application according to the traffic flow rule, and determine the network forwarding path NFP based on the host address of the first MEC application and the host address of the first destination application. In this way, the traffic flow or packet sent by the first MEC application is transmitted to the first destination application by using a network function node indicated by the NFP. For an algorithm of determining the NFP, refer to various technical means in the prior art. Details are not described in this embodiment of this application.

In an optional manner, the network forwarding path NFP defines a forwarding path of a traffic flow or packet from the first MEC application to the first destination application. In some possible embodiments, the NFP is actually also a forwarding path of a traffic flow or packet from the ME platform on which the first MEC application is located to a host or a network function node on which the first destination application is located. The NFP may include a sequence of connection points. The connection point may be an external connection point (connection point, CP) of a virtual network function (VNF), an external connection point CP of a physical network function (PNF), or a service access point (SAP) of a network service. It should be understood that types of connection points of one NFP may be different. For example, one NFP may include a CP 1 of a VNF 1, a CP 2 of a PNF 2, and a SAP 3 of a network service 3. Optionally, the connection point in the sequence of connection points included in the NFP is a connection point of an available network function node in a management domain of the ME platform manager.

The sequence of connection points included in the NFP may be implemented in a plurality of manners. For example, the sequence of connection points may be a sequence, formed based on a sequence of hops during forwarding of the packet, of connection points that are of a network function node and through which the traffic flow or packet of the first MEC application passes to reach the first destination application.

It should be understood that, in some possible embodiments, the NFP may further include a connection point of a host on which the first MEC application is located and/or a connection point of a host on which the first destination application is located.

In the foregoing technical solution, the ME platform manager may generate the NFP based on the connection point that is of the network function node and through which the traffic flow or packet of the first MEC application passes to reach the first destination application, and then request the VIM to generate the NFP, so that the ME platform uses the NFP to forward, according to the first traffic flow rule, the traffic flow or packet from the first MEC application to the first destination application. This can be implemented easily and efficiently.

Figure 4:
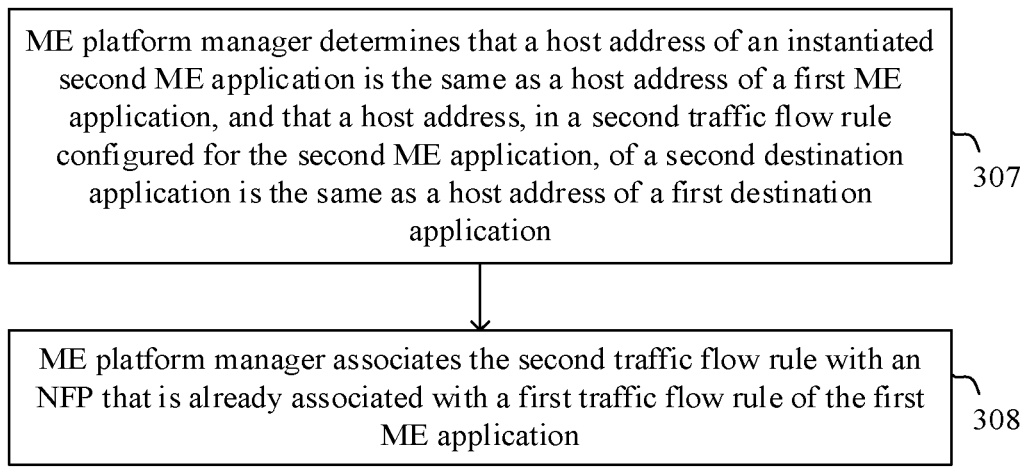

In an optional manner, referring to FIG. 4, the configuration method in this embodiment of this application further includes the following steps:

Step 307: The ME platform manager determines that a host address of an instantiated second MEC application is the same as the host address of the first MEC application, and that a host address, in a second traffic flow rule configured for the second MEC application, of a second destination application is the same as the host address of the first destination application.

Step 308: The ME platform manager associates the second traffic flow rule with the NFP that is already associated with the first traffic flow rule of the first MEC application.

In the foregoing technical solution, for the second MEC application that is instantiated after step 304 or for which the traffic flow rule is configured after step 304, if the host address of the second MEC application is the same as the host address of the first MEC application, it indicates that a traffic flow or packet from the second MEC application to the second destination application may be forwarded on a path defined by the NFP that is already created for the first MEC application. Therefore, the ME platform manager may directly associate the NFP with the second traffic flow rule of the second MEC application, so that the traffic flow or packet is forwarded from the second MEC application to the second destination application based on the path defined by the NFP. In the foregoing technical solution, the created NFP may be associated with traffic flow rules of a plurality of MEC applications. This improves utilization of the NFP and reduces overheads for determining the NFP by the ME platform manager and creating a resource for the NFP by the VIM.

Optionally, in step 307, the ME platform manager may further determine whether the NFP is already associated with the traffic flow rule of the first MEC application. Step 308 is performed if the NFP is already associated with the traffic flow rule of the first MEC application, and the ME platform manager determines that the host address of the instantiated second MEC application is the same as the host address of the first MEC application and that the host address, in the second traffic flow rule configured for the second MEC application, of the second destination application is the same as the host address of the first destination application.

Figure 5:
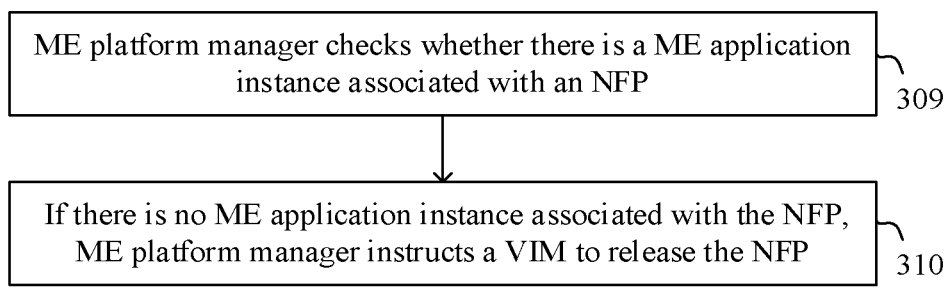

In an optional manner, referring to FIG. 5, the configuration method in this embodiment of this application further includes the following steps:

Step 309: The ME platform manager checks whether there is a MEC application instance associated with the NFP. The MEC application instance associated with the NFP is a MEC application instance of which traffic flow rule MEC application is associated with the NFP, and the ME platform may use the network resource provided by the NFP to forward a traffic flow or packet indicated by the traffic flow rule. In addition, one NFP may be associated with a plurality of MEC application instances. The ME platform manager determines that there is no MEC application instance associated with the NFP only when all MEC application instances associated with the NFP are terminated.

Step 310: If there is no MEC application instance associated with the NFP, the ME platform manager instructs the VIM to release the NFP. That the VIM releases the NFP means that the VIM releases such a special network resource, namely, the created NFP.

Optionally, if there is no MEC application instance associated with the NFP, the ME platform manager further instructs the ME platform to delete the NFP stored on the ME platform.

Optionally, if there is no MEC application instance associated with the NFP, the ME platform manager further deletes the NFP stored in the ME platform manager.

In the foregoing technical solution, as the MEC application instance associated with the NFP is terminated, the ME platform manager may instruct the VIM to release the NFP, to reduce overheads for maintaining the NFP by the VIM.

Figure 6A:
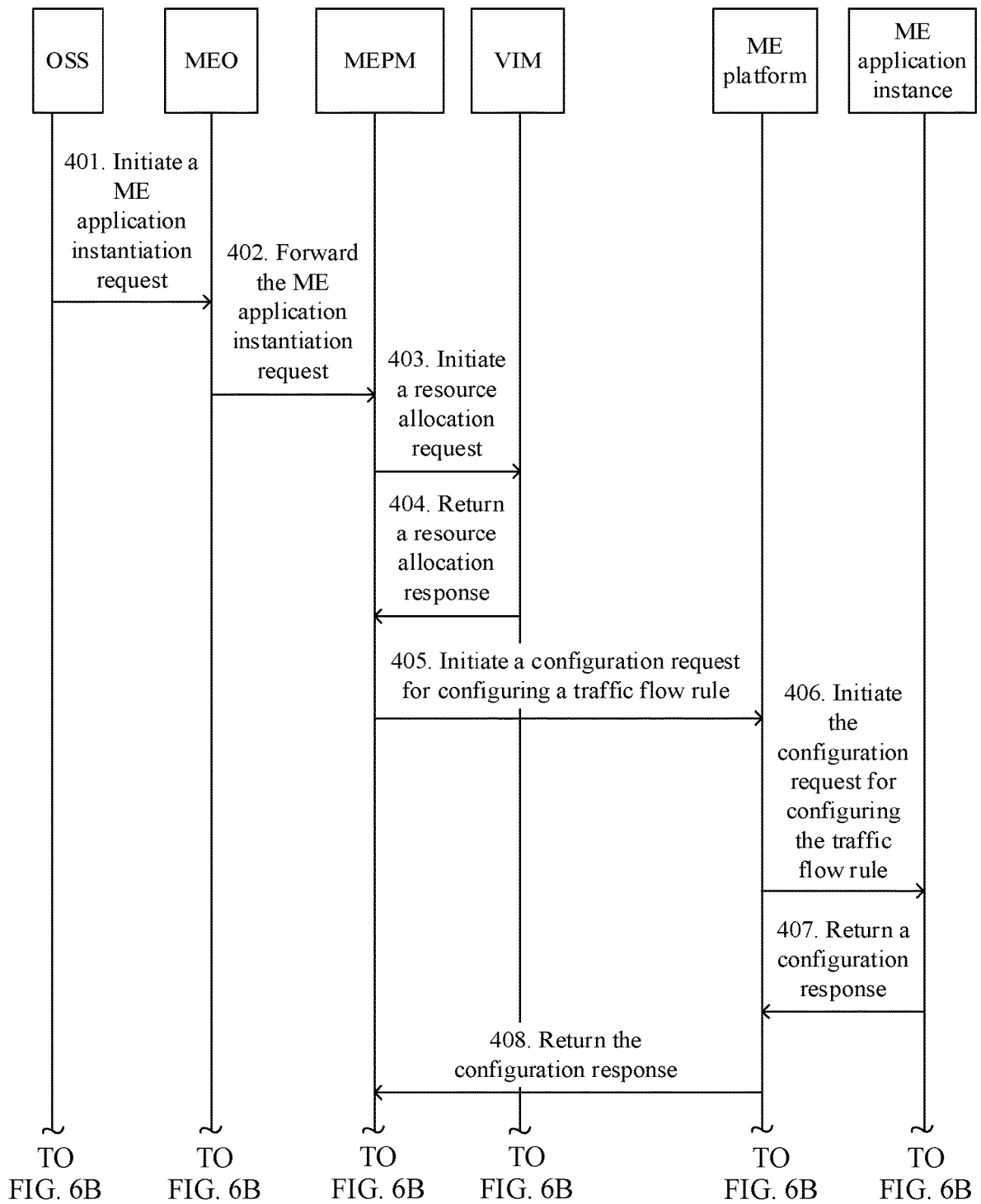
FIG. 6A and FIG. 6B and FIG. 9 are schematic flowcharts of instantiating a MEC application according to at least one embodiment of this application.
Figure 6B:
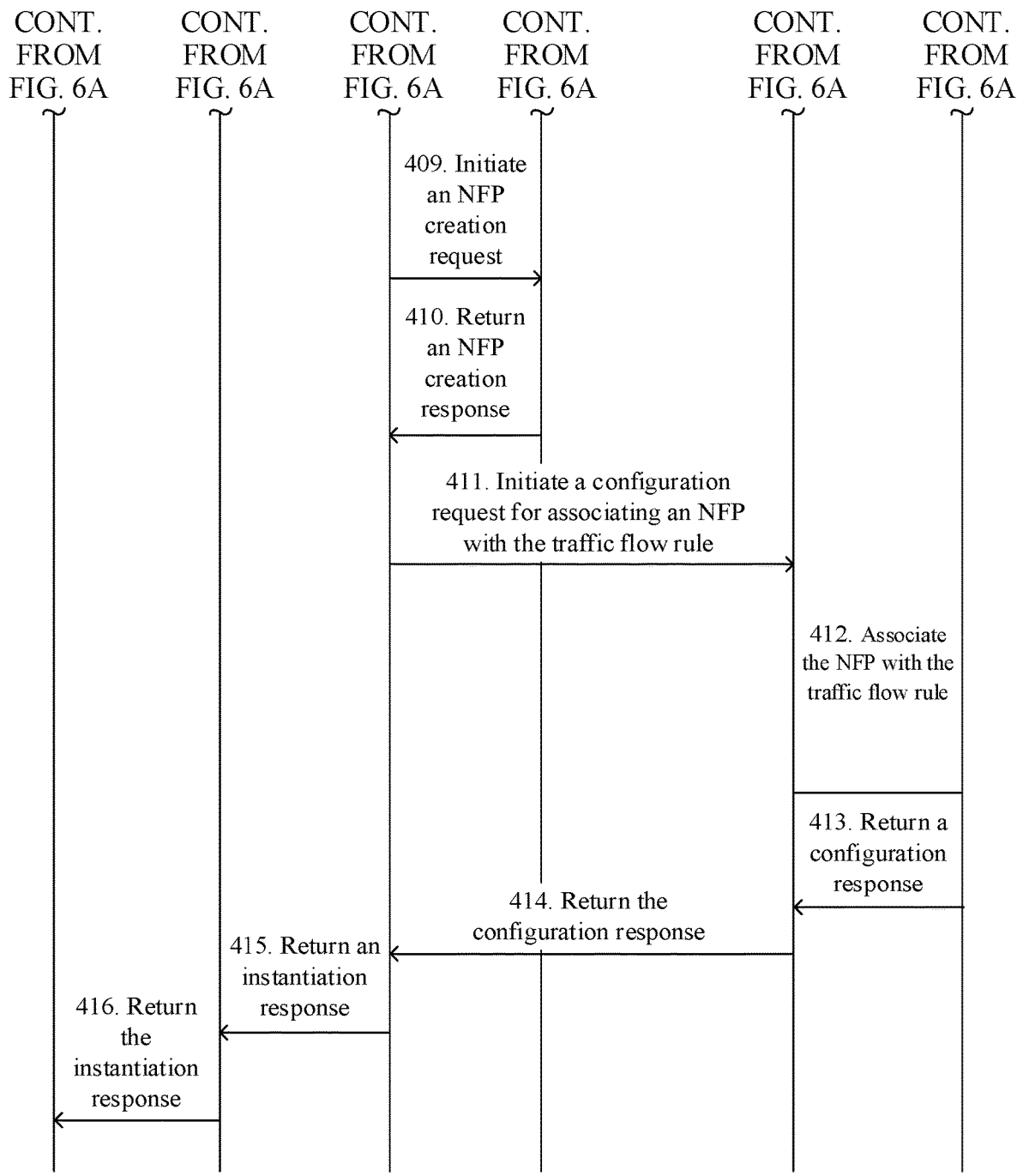

FIG. 6A and FIG. 6B show application of the configuration method in FIG. 2 to FIG. 5 in a MEC application instantiation procedure. It should be understood that the procedure shown in FIG. FIG. 6A and FIG. 6B is merely possible application of the configuration method provided in the embodiments of this application, and the protection scope of the embodiments of this application shall not be limited to the solution shown in FIG. 6A and FIG. 6B. Referring to FIG. 6A and FIG. 6B, the MEC application instantiation procedure includes the following steps:

Step 401: An operations support system (operations support system, OSS) initiates a MEC application instantiation request to a ME orchestrator.

Step 402: The ME orchestrator selects an appropriate ME platform manager, and forwards the MEC application instantiation request to the ME platform manager.

Step 403: The ME platform manager initiates a resource allocation request to a virtualized infrastructure manager VIM, to request the VIM to allocate corresponding compute, storage, and network resources to a to-be-instantiated MEC application.

Step 404: The VIM returns a resource allocation response to the ME platform manager, where the response message carries the compute, storage, and network resources allocated to the to-be-instantiated MEC application.

Step 405: The ME platform manager initiates a configuration request to a ME platform, where the request message carries a traffic flow rule used by the MEC application.

Step 406: The ME platform manager initiates the configuration request to a MEC application instance to which the resources are already allocated, where the request message carries the traffic flow rule used by the MEC application.

Step 407: The MEC application instance accepts the traffic flow rule, and returns a configuration response to the ME platform, to indicate a result of configuring the traffic flow rule.

Step 408: The ME platform further returns the configuration response to the ME platform manager, to indicate the result of configuring the traffic flow rule.

Step 409: The ME platform manager initiates an NFP creation request to the VIM and determines, based on information about a CP or SAP of an available network function node in a management domain of the ME platform manager, a packet forwarding path from a network function node on which the MEC application is located to a network function node on which a destination application corresponding to the traffic flow rule is located, to forward, on the created NFP, a traffic flow or packet that is of the MEC application and that matches the traffic flow rule. The NFP creation request carries a sequence including CPs or SAPs of all intermediate forwarding network function nodes. Alternatively, a forwarding path that matches the traffic flow rule is dynamically generated according to a user-defined NFP rule.

Step 410: The VIM returns an NFP creation response to the ME platform manager, where the response message indicates a result of creating the NFP.

Step 411: The ME platform manager initiates a configuration request to the ME platform, where the request message carries identification information of an NFP that matches the traffic flow rule used by the MEC application and identification information of the traffic flow rule.

Step 412: The ME platform associates, in the ME application instance, the newly created NFP with the traffic flow rule.

Step 413: The ME application instance returns a configuration response to the ME platform, to indicate a configuration result of associating the NFP with the traffic flow rule.

Step 414: The ME platform returns a configuration response to the ME platform manager, to indicate a configuration result of associating the NFP with the traffic flow rule.

Step 415: The ME platform manager returns a MEC application instantiation response to the ME orchestrator, where the response message carries an execution result MEC application of MEC application instantiation.

Step 416: The ME orchestrator returns the MEC application instantiation response to the OSS, where the response message carries the execution result MEC application of MEC application instantiation.

It should be noted that, when subsequently using the traffic flow rule to forward the traffic flow or packet of the MEC application, the ME platform first determines a forwarding action (for example, discarding, duplicated forwarding, or original forwarding) performed on the packet according to the traffic flow rule. If the forwarding action is forwarding, the ME platform further determines, based on a network forwarding path associated with the traffic flow rule, a CP or SAP of a next-hop network function node of a network function node on which the MEC application is located, and forwards the packet to the CP or SAP of the next-hop network function node. Similarly, each intermediate forwarding network function node on the NFP stores the identification information of the NFP and determines, based on the identification information that is of the NFP and that is carried in a forwarded packet, the NFP used for packet forwarding. Further, each intermediate network function node determines a CP or SAP of a next-hop network function node based on a location of a CP or SAP that is of the network function node and that is in the sequence of the NFP, until the packet reaches a CP or SAP of a network function node on which a destination application is located, to complete a function of forwarding the packet on the path.

In the foregoing technical solution, a traffic flow rule and a forwarding resource (NFP) are associated in a process of application instantiation, and efficiency is relatively high.

Additionally, an application descriptor of the MEC application includes a traffic flow rule, where the traffic flow rule includes a forwarding interface description, and the forwarding interface description is used to describe a policy used by the MEC application to forward a traffic flow or packet. In the prior art, an IP address and/or a MAC address of a forwarding interface need/needs to be preconfigured in a forwarding interface description of a traffic flow rule of an application descriptor, so that a ME platform forwards according to the traffic flow rule, a packet indicated by a filter criterion of the traffic flow rule to an interface that is of a MEC application and that uses the preconfigured IP address and/or MAC address. However, an address of the forwarding interface of the MEC application is set as a fixed address in the application descriptor, and this results in low address resource utilization and is inapplicable to a scenario in which an address of an interface of the MEC application is dynamically allocated.

Figure 7:
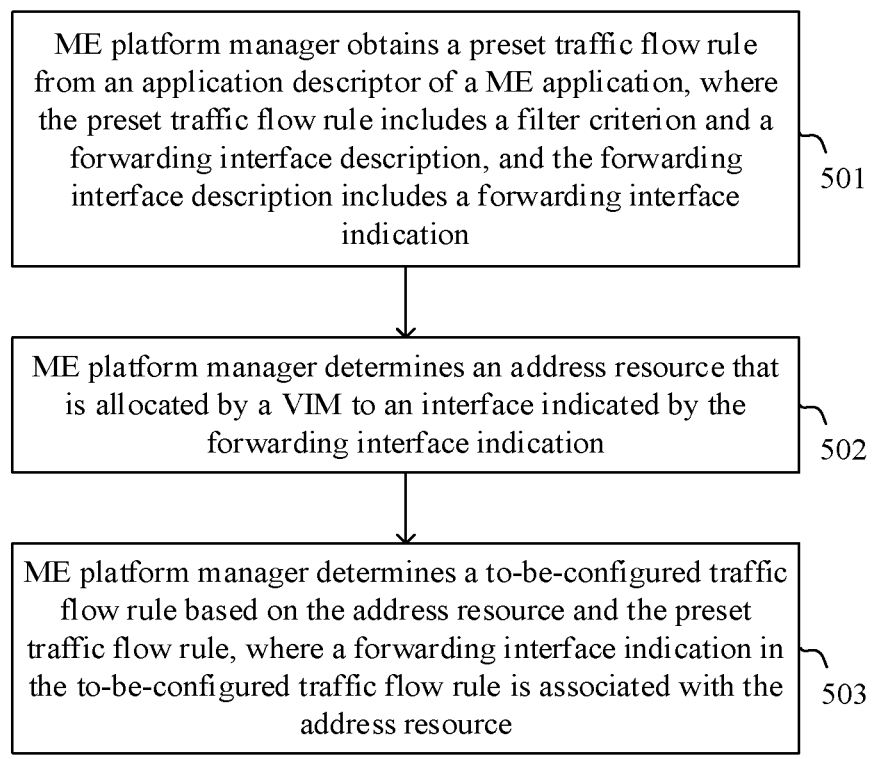

To resolve the foregoing problem that the forwarding interface description is inapplicable to the scenario in which an address of an interface of the MEC application is dynamically allocated, an embodiment of this application provides another configuration method. Referring to FIG. 7, the configuration method includes the following steps:

Step 501: A ME platform manager obtains a preset traffic flow rule from an application descriptor of a MEC application, where the preset traffic flow rule includes a filter criterion and a forwarding interface description, and the forwarding interface description includes a forwarding interface indication.

It should be understood that, in addition to the traffic flow rule, the application descriptor may further include content such as a resource requirement description, a DNS rule, and a dependent service description. In addition to the forwarding interface description, the preset traffic flow rule may further include content such as a traffic flow rule identifier (identification, ID), a filter criterion description, and an action description. The filter criterion description specifies different traffic flows or packets, of the MEC application, that require differentiated transmission processing, and the filter criterion description includes information such as source/destination internet protocol (IP) addresses, source/destination port numbers, a protocol type, source/destination tunnel addresses, and source/destination tunnel ports. The action description specifies a transmission policy performed for a target traffic flow or packet, including discarding, forwarding, encapsulating/decapsulating, duplicating, or not processing the packet. The forwarding interface description indicates an object used for forwarding when the transmission policy is forwarding, and includes a description of information such as an interface type, tunnel information, a source media access control (MAC) address, a destination MAC address, and a destination IP address. Table 1 shows a possible implementation of the forwarding interface description according to an embodiment of this application.

TABLE 1

| Attribute name | Cardinality | Parameter type |
| --- | --- | --- |
| Interface type (interfaceType) | 1 | Enumeration (Enum) |
| Tunnel information | 0/1 | TunnelInfo |
| Source MAC address | 0/1 | Character string (String) |
| Destination MAC address | 0/1 | Character string (String) |
| Destination IP address | 0/1 | Character string (String) |
| Forwarding interface indication | 0/1 | Identifier (Identifier) |

The forwarding interface indication in Table 1 may be an application external connection point (application external connection point, AppExtCp) field in the application descriptor, and is used to indicate a destination interface to which a traffic flow or packet defined by the filter criterion in the present traffic flow rule is forwarded.

Step 502: The ME platform manager determines an address resource that is allocated by a VIM to an interface indicated by the forwarding interface indication.

Step 503: The ME platform manager determines a to-be-configured traffic flow rule based on the address resource and the preset traffic flow rule, where a forwarding interface indication in the to-be-configured traffic flow rule is associated with the address resource. The forwarding interface indication may be associated with the address resource in a plurality of manners, including but not limited to: adding an identifier of the address resource to the forwarding interface description; or adding an address or address range corresponding to the address resource to the forwarding interface description; adding other information pointing to the address resource to the forwarding interface description; or adding information that points from an AppExtCp to the forwarding interface description, for example, a number of the forwarding interface description, to the application interface description of the AppD. Alternatively, the ME platform manager maintains a mapping between the forwarding interface indication/forwarding interface description/traffic flow rule and the address resource.

In the foregoing technical solution, an address of a forwarding interface may not be set in the application descriptor of the MEC application, but instead indication information (for example, the AppExtCp) of the forwarding interface is added. After the VIM allocates an address resource to the forwarding interface, the allocated address resource is associated with the forwarding interface indication/forwarding interface description/traffic flow rule. For example, an allocated MAC address and/or IP address are/is associated with the traffic flow rule based on information about a specified interface type, to set an address of an interface used for forwarding a traffic flow or packet indicated by a filter criterion in the traffic flow rule. The foregoing method is not only applicable to a scenario in which an address resource of an interface of the MEC application is dynamically allocated, but also avoids low address resource utilization resulting from configuration of a fixed address for the MEC application.

Figure 8:
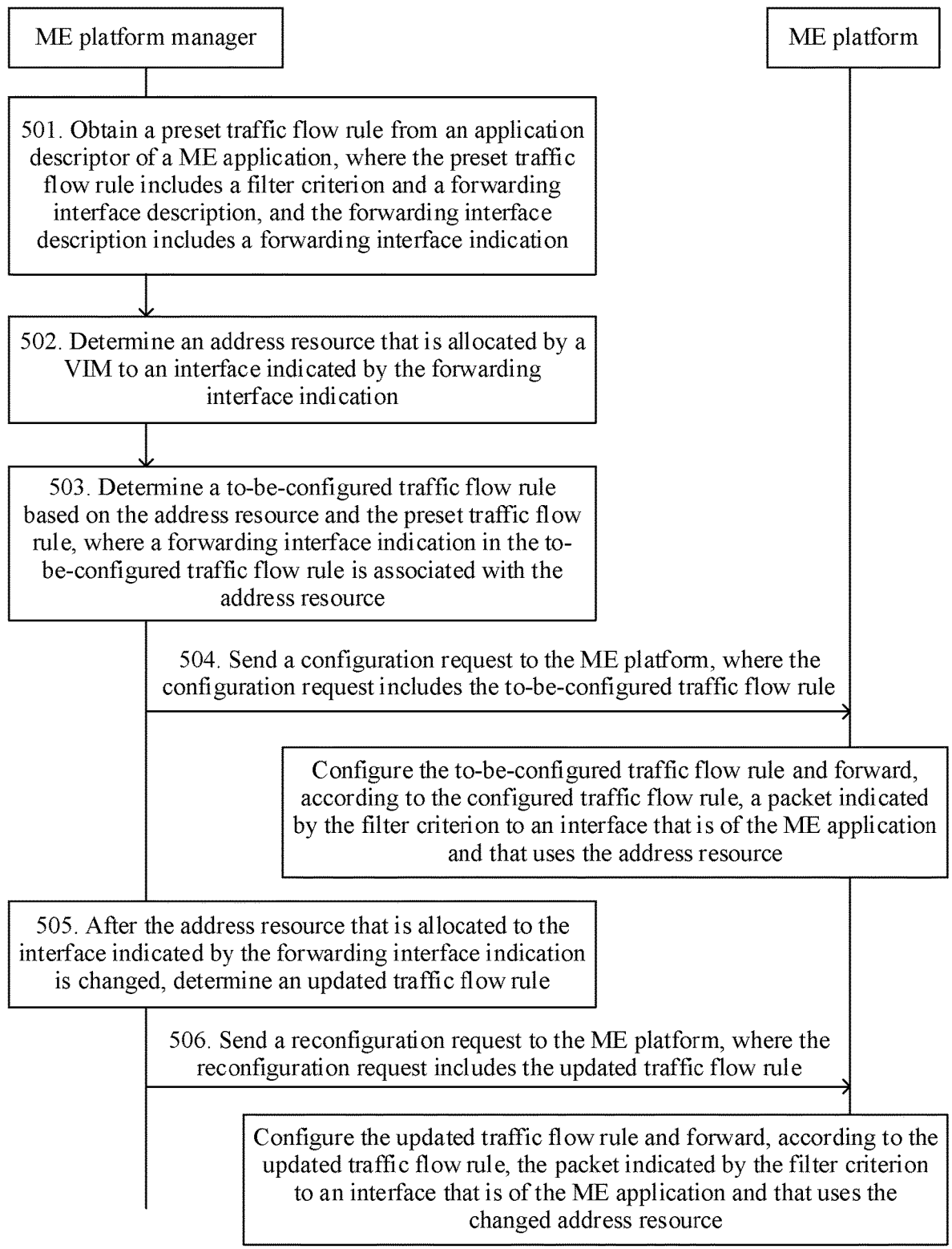

In an optional manner, referring to FIG. 8, after step 503, the configuration method further includes the following step:

Step 504: The ME platform manager sends a configuration request to a ME platform that manages the MEC application, where the configuration request includes the to-be-configured traffic flow rule and is used to request the ME platform to configure the to-be-configured traffic flow rule and forward, according to the configured traffic flow rule, a packet indicated by the filter criterion to an interface that is of the MEC application and that uses the address resource.

In the foregoing technical solution, the to-be-configured traffic flow rule is configured for a MEC application instance, so that the ME platform forwards a traffic flow indicated by the filter criterion or the packet indicated by the filter criterion to an interface of the MEC application instance, where an address of the interface may be dynamically allocated.

In an optional manner, after step 504, the ME platform performs configuration for the MEC application instance, and configures the interface that is of the MEC application instance and that uses the address resource to receive the packet indicated by the filter criterion.

In an optional manner, still referring to FIG. 8, after step 504, the configuration method further includes the following steps:

Step 505: After the address resource that is allocated to the interface indicated by the forwarding interface indication is changed, the ME platform manager determines an updated traffic flow rule, where a forwarding interface indication in the updated traffic flow rule is associated with a changed address resource.

Step 506: The ME platform manager sends a reconfiguration request to the ME platform, where the reconfiguration request includes the updated traffic flow rule and is used to request the ME platform to configure the updated traffic flow rule and forward, according to the updated traffic flow rule, the packet indicated by the filter criterion to an interface that is of the MEC application and that uses the changed address resource.

In the foregoing technical solution, after the address resource of the interface of the MEC application is changed, the ME platform manager updates the traffic flow rule and requests the ME platform to reconfigure an updated traffic flow rule, so that the traffic flow or packet indicated by the filter criterion is forwarded to an interface of the MEC application instance, where an address of the interface may be dynamically changed.

Figure 9:
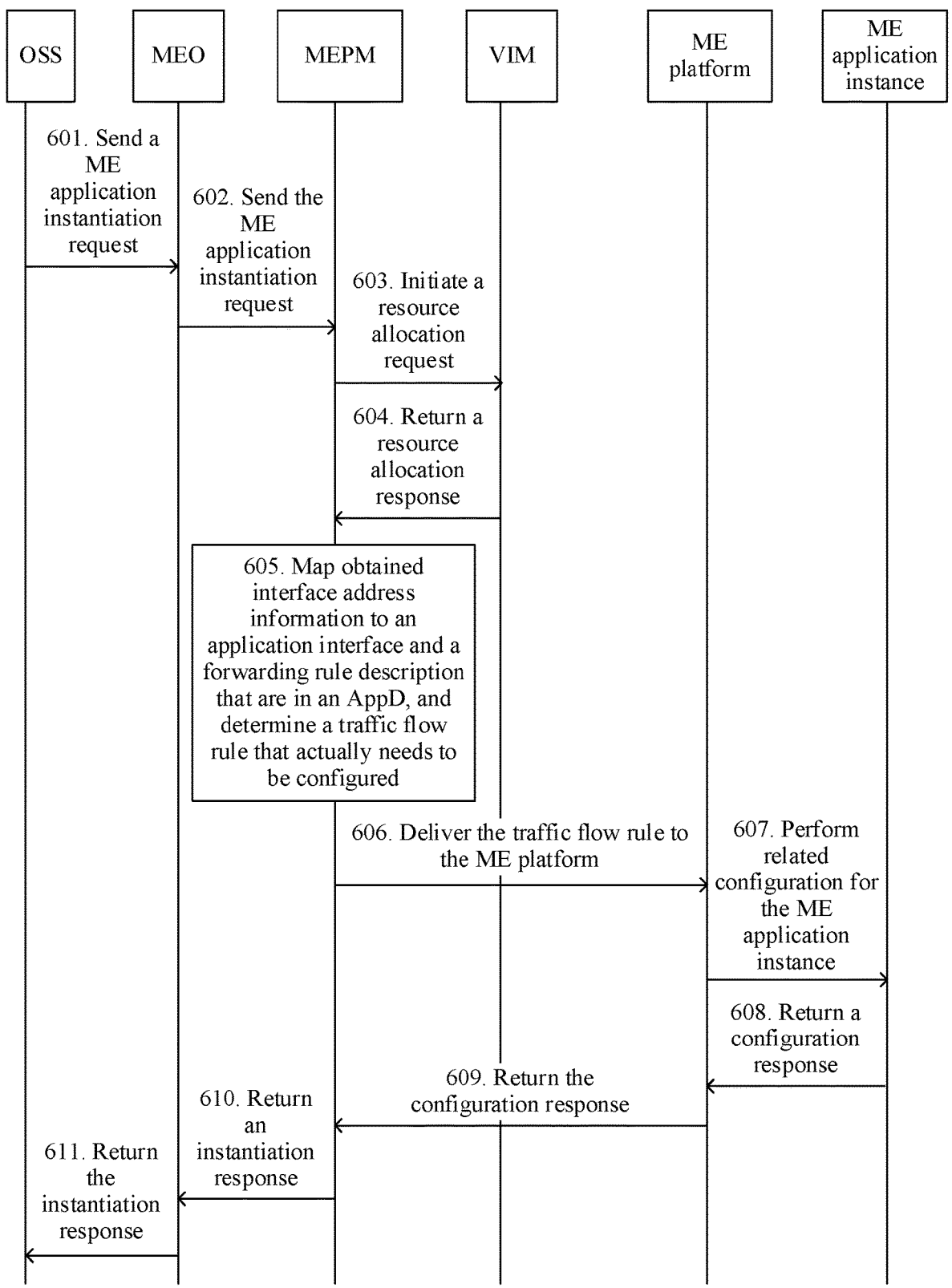

FIG. 9 shows application of the configuration method in FIG. 7 and FIG. 8 in a MEC application instantiation procedure. It should be understood that the procedure shown in FIG. 9 is merely possible application of the configuration method provided in the embodiments of this application, and the protection scope of the embodiments of this application shall not be limited to the solution shown in FIG. 9. Referring to FIG. 9, the MEC application instantiation procedure includes the following steps:

Step 601: An OSS sends an application instantiation request to a ME orchestrator.

Step 602: The ME orchestrator sends the application instantiation request to a ME platform manager.

Step 603: The ME platform manager sends a resource allocation request to a VIM, where a request parameter includes a quantity of interfaces of an application and a requirement of dynamically allocating an address to each interface, such as a protocol type or a range of an allocated address.

Step 604: After completing resource allocation, the VIM sends a resource allocation response to the ME platform manager, where the response includes information about an address actually allocated to each interface of the application or a resource object identifier that can be used to query an allocated address.

Step 605: The ME platform manager maps obtained interface address information to an application interface and a forwarding rule description that are in an AppD, and determines a traffic flow rule that actually needs to be configured. For example:

A traffic flow rule in the AppD is defined as follows:

A data packet whose source IP address is 192.168.2.1 is forwarded to an interface whose AppExtCpId is Eth1. The ME platform manager requests the VIM to allocate a resource based on a description of the Eth1 in the AppD in step 603, and obtains in step 604 (or through query by using the resource object identifier in step 604) an address that is actually allocated to the Eth1 after instantiation, for example, 10.1.1.1. Then, the MEPM converts the traffic flow rule in the AppD into the following: The data packet whose source IP address is 192.168.2.1 is sent to the interface whose address is 10.1.1.1, and the traffic flow rule is sent as a request parameter in step 606.

Step 606: The ME platform manager delivers the traffic flow rule to a ME platform for configuration.

Step 607: The ME platform performs related configuration for a MEC application instance.

Step 608: The MEC application instance returns a configuration response to the ME platform.

Step 609: The ME platform returns the configuration response to the ME platform manager.

Step 610: The ME platform manager returns an instantiation response to the ME orchestrator.

Step 611: The ME orchestrator returns the instantiation response to the OSS.

In the foregoing technical solution, a dynamically allocated address of a forwarding interface is configured in a process of application instantiation, and efficiency is relatively high.

It should be understood that the configuration method in any one of FIG. 2 to FIG. 6A and FIG. 6B and the configuration method in any one of FIG. 7 to FIG. 9 may be implemented in combination. In other words, in a same MEC architecture, the configuration method in any one of FIG. 2 to FIG. 6A and FIG. 6B and the configuration method in any one of FIG. 7 to FIG. 9 may be simultaneously implemented.

Figure 10:
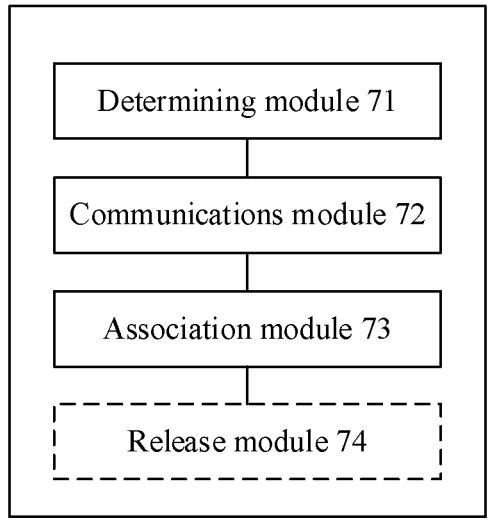
FIG. 10 to FIG. 12 are schematic diagrams of configuration apparatuses according to at least one embodiment of this application.

FIG. 10 shows a configuration apparatus according to an embodiment of this application. The configuration apparatus may be configured to implement a function of the ME platform manager in the configuration method corresponding to any one of FIG. 2 to FIG. 9. The configuration apparatus includes a determining module 71, a communications module 72, and an association module 73.

The determining module 71 is configured to determine a network forwarding path NFP from an instantiated first MEC application to a first destination application, where the NFP is used to indicate a forwarding path of a traffic flow or packet that is sent by the first MEC application to the first destination application. The communications module 72 is configured to send an NFP creation request to a VIM, to request the VIM to create the NFP determined by the ME platform manager. The association module 73 is configured to associate the NFP created by the VIM with a first traffic flow rule configured for the first MEC application.

In an optional manner, the communications module 72 is further configured to send a configuration request to a ME platform that manages the first MEC application, to request the ME platform to perform configuration for an instance of the first MEC application and associate the created NFP with the first traffic flow rule.

In an optional manner, the determining module 71 is specifically configured to: determine a host address of the first destination application according to the first traffic flow rule, and determine the NFP based on a host address of the first MEC application and the host address of the first destination application.

In an optional manner, the NFP includes a sequence, formed based on a sequence of hops during forwarding of the packet, of connection points that are of a network function node and through which the traffic flow or packet of the first MEC application passes to reach the first destination application.

In an optional manner, the determining module 71 is further configured to determine that a host address of an instantiated second MEC application is the same as the host address of the first MEC application, and that a host address, in a second traffic flow rule configured for the second MEC application, of a second destination application is the same as the host address of the first destination application.

The association module 73 is further configured to associate the second traffic flow rule with the created NFP.

In an optional implementation, the configuration apparatus further includes a release module 74.

The release module 74 is configured to: check whether there is a MEC application instance associated with the created NFP, and if there is no MEC application instance associated with the created NFP, instruct the VIM to release the created NFP.

In an optional implementation, the determining module 71 is further configured to: before determining the NFP, obtain the preset first traffic flow rule from an application descriptor of the first MEC application, where the preset first traffic flow rule includes a filter criterion and a forwarding interface description, and the forwarding interface description includes a forwarding interface indication; determine an address resource that is allocated by the VIM to an interface indicated by the forwarding interface indication; and determine a to-be-configured first traffic flow rule based on the address resource and the preset first traffic flow rule, where a forwarding interface indication in the to-be-configured first traffic flow rule is associated with the address resource.

In an optional implementation, the communications module 72 is further configured to send a configuration request to the ME platform, where the configuration request includes the to-be-configured first traffic flow rule and is used to request the ME platform to configure the to-be-configured first traffic flow rule and forward, according to the configured first traffic flow rule, a packet indicated by the filter criterion to an interface that is of the first MEC application and that uses the address resource.

In an optional implementation, the determining module 71 is further configured to: after the address resource that is allocated to the interface indicated by the forwarding interface indication is changed, determine an updated first traffic flow rule, where a forwarding interface indication in the updated first traffic flow rule is associated with a changed address resource.

In an optional implementation, the communications module 72 is further configured to send a reconfiguration request to the ME platform, where the reconfiguration request includes the updated first traffic flow rule and is used to request the ME platform to configure the updated first traffic flow rule and forward, according to the updated first traffic flow rule, the packet indicated by the filter criterion to an interface that is of the first MEC application and that uses the changed address resource.

In this embodiment of the present invention, module division is an example, and is merely logical function division and may be another division manner in actual implementation. In addition, function modules in the embodiments of the present invention may be integrated into one processor, or each of the modules may exist alone physically, or two or more modules may be integrated into one module. The integrated module may be implemented in a form of hardware, or may be implemented in a form of a software function module.

Figure 11:
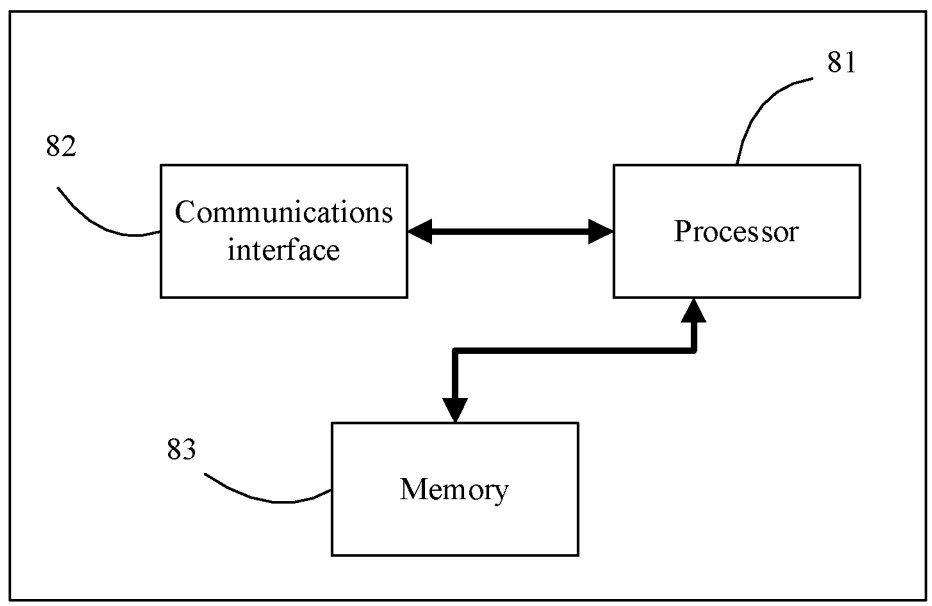

When the integrated module is implemented in the form of hardware, as shown in FIG. 11, a configuration apparatus may include a processor 81. Hardware of the entities corresponding to the determining module 71, the association module 73, and the release module 74 may be the processor 81. The processor 81 may be one or more central processing units (central processing unit, CPU), a digital processing module, or the like. The configuration apparatus may further include a communications interface 82. The processor 81 communicates with a host or a network management apparatus by using the communications interface 82. Hardware of an entity corresponding to the communications module 72 may be the communications interface 82. The configuration apparatus further includes a memory 83, configured to store a program executed by the processor 81. The memory 83 may be a nonvolatile memory, such as a hard disk drive (hard disk drive, HDD) or a solid-state drive (solid-state drive, SSD), or may be a volatile memory (volatile memory) such as a random access memory (random access memory, RAM). The memory 83 is any other medium that can be configured to carry or store expected program code in a form of an instruction or a data structure and that can be accessed by a computer. However, the memory 83 is not limited thereto.

For an implementation of the foregoing configuration apparatus and composition modules thereof, refer to steps performed by the ME platform manager in the configuration method corresponding to any one of FIG. 2 to FIG. 9, and repeated descriptions are omitted.

Figure 12:
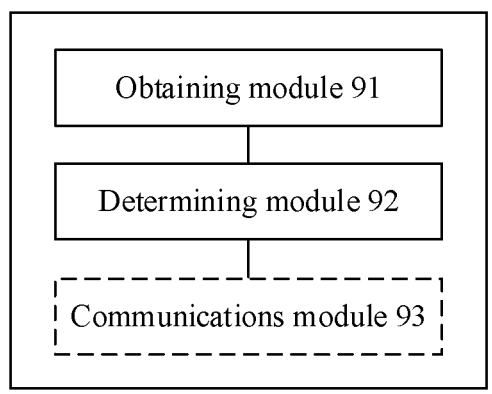

FIG. 12 is another configuration apparatus according to an embodiment of this application. The configuration apparatus may be configured to implement a function of the ME platform manager in the configuration method corresponding to any one of FIG. 7 to FIG. 9. The configuration apparatus includes an obtaining module 91 and a determining module 92.

The obtaining module 91 is configured to obtain a preset traffic flow rule from an application descriptor of a MEC application, where the preset traffic flow rule includes a filter criterion and a forwarding interface description, and the forwarding interface description includes a forwarding interface indication. The determining module 92 is configured to: determine an address resource that is allocated by a VIM to an interface indicated by the forwarding interface indication; and determine a to-be-configured traffic flow rule based on the address resource and the preset traffic flow rule, where a forwarding interface indication in the to-be-configured traffic flow rule is associated with the address resource.

In an optional manner, the configuration apparatus further includes a communications module 93, configured to: after the determining module determines the to-be-configured traffic flow rule, send a configuration request to a ME platform that manages the MEC application, where the configuration request includes the to-be-configured traffic flow rule and is used to request the ME platform to configure the to-be-configured traffic flow rule and forward, according to the configured traffic flow rule, a packet indicated by the filter criterion to an interface that is of the MEC application and that uses the address resource.

In an optional manner, the determining module 92 is further configured to: after the address resource that is allocated to the interface indicated by the forwarding interface indication is changed, determine an updated traffic flow rule, where the forwarding interface indication in the updated traffic flow rule is associated with a changed address resource; and the communications module 93 is further configured to send a reconfiguration request to the ME platform, where the reconfiguration request includes the updated traffic flow rule and is used to request the ME platform to configure the updated traffic flow rule and forward, according to the updated traffic flow rule, the packet indicated by the filter criterion to an interface that is of the MEC application and that uses the changed address resource.

When an integrated module is implemented in a form of hardware, the configuration apparatus may include a processor. Hardware of the entities corresponding to the obtaining module 91 and the determining module 92 may be the processor. The configuration apparatus may further include a communications interface. The processor communicates with a host or a network management apparatus by using the communications interface. Hardware of an entity corresponding to the communications module 93 may be the communications interface. The configuration apparatus further includes a memory, configured to store a program executed by the processor. The memory may be a nonvolatile memory, such as a hard disk drive (HDD) or a solid-state drive (SSD), or may be a volatile memory (volatile memory) such as a random access memory (RAM). The memory 83 is any other medium that can be configured to carry or store expected program code in a form of an instruction or a data structure and that can be accessed by a computer. However, the memory is not limited thereto.

For an implementation of the foregoing configuration apparatus and composition modules thereof, refer to steps performed by the ME platform manager in the configuration method corresponding to any one of FIG. 7 to FIG. 9, and repeated descriptions are omitted.

An embodiment of this application further provides a resource creation apparatus, including a communications module and a resource creation module. The communications module is configured to receive an NFP creation request sent by a ME platform manager, where the NFP request includes an NFP generated by the ME platform manager. The resource creation module is configured to create the NFP. The communications module is further configured to return a creation result to the ME platform manager.

For an implementation of the foregoing configuration apparatus and composition modules thereof, refer to steps performed by the VIM in the configuration method corresponding to any one of FIG. 2 to FIG. 6A and FIG. 6B, and repeated descriptions are omitted.

An embodiment of this application further provides a configuration apparatus, including a communications module and a configuration module. The communications module is configured to receive a configuration request sent by a ME platform manager, where the configuration request includes an identifier of a created NFP and an identifier of a traffic flow rule of a MEC application. The configuration module is configured to: perform configuration for an instance of the MEC application and associate the identifier of the NFP with the identifier of the traffic flow rule.

For an implementation of the foregoing configuration apparatus and composition modules thereof, refer to steps performed by the ME platform manager in the configuration method corresponding to any one of FIG. 2 to FIG. 9, and repeated descriptions are omitted.

This application provides a computer-readable storage medium, where the computer-readable storage medium stores a computer instruction, and when the instruction is run on a computer, the computer is enabled to perform the configuration method corresponding to any one of FIG. 2 to FIG. 9.

This application provides a computer program product, and when the computer program product is run on a computer, the computer is enabled to perform the configuration method corresponding to any one of FIG. 2 to FIG. 9.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of the any other programmable data processing device generate an apparatus for implementing a specific function in one or more processes in the flowcharts and/or in one or more blocks in the block diagrams. These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a mobile edge (ME) platform manager (MEPM), a network forwarding path (NFP) from an instantiated first mobile edge computing (MEC) application to a first destination application, wherein the NFP indicates a forwarding path of a traffic flow or packet that is sent by the first MEC application to the first destination application;
   sending, by the ME platform manager, an NFP creation request to a virtualized infrastructure manager (VIM), to request the VIM to create the NFP determined by the ME platform manager; and associating, by the ME platform manager, the NFP created by the VIM with a first traffic flow rule configured for the first MEC application.

2. The method according to claim 1, further comprising:
sending, by the ME platform manager, a configuration request to a ME platform that manages the first MEC application, to request the ME platform to perform configuration for an instance of the first MEC application and associate the created NFP with the first traffic flow rule.

3. The method according to claim 1, wherein the determining, by the ME platform manager, the NFP from the first MEC application to the first destination application comprises:
determining, by the ME platform manager, a host address of the first destination application according to the first traffic flow rule; and
determining, by the ME platform manager, the NFP based on a host address of the first MEC application and the host address of the first destination application.

4. The method according to claim 3, wherein the NFP comprises a sequence, formed based on a sequence of hops during forwarding of the packet, of connection points that are of a network function node and through which the traffic flow or packet of the first MEC application passes to reach the first destination application.

5. The method according to claim 1, further comprising:
determining, by the ME platform manager, that a host address of an instantiated second MEC application is the same as a host address of the first MEC application, and that a host address, in a second traffic flow rule configured for the second MEC application, of a second destination application is the same as a host address of the first destination application; and
associating, by the ME platform manager, the second traffic flow rule with the created NFP.

6. The method according to claim 1, further comprising:
checking, by the ME platform manager, whether there is a MEC application instance associated with the created NFP; and
if there is no MEC application instance associated with the created NFP, instructing the VIM to release the NFP.

7. The method according to claim 1, before the determining, by the ME platform manager, the NFP, further comprising:
obtaining, by the ME platform manager, the first traffic flow rule from an application descriptor of the first MEC application, wherein the first traffic flow rule comprises a filter criterion and a forwarding interface description, and the forwarding interface description comprises a forwarding interface indication;
determining, by the ME platform manager, an address resource that is allocated by the VIM to an interface indicated by the forwarding interface indication; and
determining, by the ME platform manager, a to-be-configured first traffic flow rule based on the address resource and the first traffic flow rule, wherein a forwarding interface indication in the to-be-configured first traffic flow rule is associated with the address resource.

8. The method according to claim 7, after the determining, by the ME platform manager, the to-be-configured first traffic flow rule, further comprising:
sending, by the ME platform manager, a configuration request to the ME platform, wherein the configuration request comprises the to-be-configured first traffic flow rule and is used to request the ME platform to configure the to-be-configured first traffic flow rule and forward, according to the configured first traffic flow rule, a packet indicated by the filter criterion to an interface that is of the first MEC application and that uses the address resource.

9. The method according to claim 8, further comprising:
after the address resource that is allocated to the interface indicated by the forwarding interface indication is changed, determining, by the ME platform manager, an updated first traffic flow rule, wherein the forwarding interface indication in the updated first traffic flow rule is associated with a changed address resource; and
sending, by the ME platform manager, a reconfiguration request to the ME platform, wherein the reconfiguration request comprises the updated first traffic flow rule and is used to request the ME platform to configure the updated first traffic flow rule and forward, according to the updated first traffic flow rule, the packet indicated by the filter criterion to an interface that is of the first MEC application and that uses a changed address resource.

10. A mobile edge (ME) platform manager (MEPM), comprising:
one or more processors; and
a non-transitory computer-readable memory storing a program to be executed by the one or more processors, the program including instructions to: determine a network forwarding path (NFP) from an instantiated first mobile edge computing (MEC) application to a first destination application; wherein the NFP indicates a forwarding path of a traffic flow or packet that is sent by the first MEC application to the first destination application;
send an NFP creation request to a virtualized infrastructure manager (VIM), to request the VIM to create the NFP; and
associate the NFP created by the VIM with a first traffic flow rule configured for the first MEC application.

11. The MEPM according to claim 10, wherein the program further includes instructions to: send a configuration request to a mobile edge (ME) platform that manages the first MEC application, to request the ME platform to perform configuration for an instance of the first MEC application and associate the created NFP with the first traffic flow rule.

12. The MEPM according to claim 11, wherein the program includes instructions to: before determining the NFP, obtain the first traffic flow rule from an application descriptor of the first MEC application, wherein the first traffic flow rule comprises a filter criterion and a forwarding interface description, and the forwarding interface description comprises a forwarding interface indication; determine an address resource that is allocated by the VIM to an interface indicated by the forwarding interface indication; and determine a to-be-configured first traffic flow rule based on the address resource and the first traffic flow rule, wherein the forwarding interface indication in the to-be-configured first traffic flow rule is associated with the address resource.

13. The MEPM according to claim 12, wherein the program includes instructions to send a configuration request to the ME platform, wherein the configuration request comprises the to-be-configured first traffic flow rule and is used to request the ME platform to configure the to-be-configured first traffic flow rule and forward; according to the configured first traffic flow rule, a packet indicated by the filter criterion to an interface that is of the first MEC application and that uses the address resource.

14. The MEPM according to claim 13, wherein the program includes instructions to: after the address resource that is allocated to the interface indicated by the forwarding interface indication is changed, determine an updated first traffic flow rule, wherein the forwarding interface indication in the updated first traffic flow rule is associated with a changed address resource; and
  send a reconfiguration request to the ME platform, wherein the reconfiguration request comprises the updated first traffic flow rule and is used to request the ME platform to configure the updated first traffic flow rule and forward; according to the updated first traffic flow rule, the packet indicated by the filter criterion to the interface that is of the first MEC application and that uses the changed address resource.

15. The MEPM according to claim 10, wherein the program further includes instructions to: determine a host address of the first destination application according to the first traffic flow rule, and determine the NFP based on a host address of the first MEC application and the host address of the first destination application.

16. The MEPM according to claim 15, wherein the NFP comprises a sequence, formed based on a sequence of hops during forwarding of the packet, of connection points that are of a network function node and through which the traffic flow or packet of the first MEC application passes to reach the first destination application.

17. The MEPM according to claim 10, wherein the program further includes instructions to: determine that a host address of an instantiated second MEC application is the same as a host address of the first MEC application, and that a host address, in a second traffic flow rule configured for the second MEC application, of a second destination application is the same as a host address of the first destination application; and to associate the second traffic flow rule with the created NFP.

18. The MEPM according to claim 10, wherein the program includes instructions to: check whether there is a MEC application instance associated with the created NFP, and if there is no MEC application instance associated with the created NFP, instruct the VIM to release the created NFP.

19. A method, comprising:
  determining, by a mobile edge (ME) platform manager (MEPM), a network forwarding path (NFP) from an instantiated first mobile edge computing (MEC) application to a first destination application, wherein the NFP indicates a forwarding path of a traffic flow or packet that is sent by the first MEC application to the first destination application;
  sending, by the ME platform manager, an NFP creation request to a virtualized infrastructure manager (VIM), to request the VIM to create the NFP determined by the ME platform manager;
  receiving, by the VIM, the NFP creation request;
  creating, by the VIM, the NFP; and
  associating, by the ME platform manager, the NFP created by the VIM with a first traffic flow rule configured for the first MEC application.

20. The method according to claim 19, further comprising:
  sending, by the ME platform manager, a configuration request to a ME platform that manages the first MEC application, to request the ME platform to perform configuration for an instance of the first MEC application and associate the created NFP with the first traffic flow rule; and
  receiving, by the ME platform, the configuration request.

21. A communications system, comprising a mobile edge (ME) platform manager (MEPM) and a virtualized infrastructure manager (VIM), wherein
  the MEPM is configured to:
  determine a network forwarding path (NFP) from an instantiated first mobile edge computing (MEC) application to a first destination application, wherein the NFP indicates a forwarding path of a traffic flow or packet that is sent by the first MEC application to the first destination application;
  send an NFP creation request to the VIM, to request the VIM to create the NFP determined by the ME platform manager;
  associate the NFP created by the VIM with a first traffic flow rule configured for the first MEC application; and
  the VIM is configured to:
  receive the NFP creation request;
  create the NFP.

22. The system according to claim 21, wherein the system further comprises an ME platform, wherein
  the MEPM is further configured to:
  send a configuration request to the ME platform that manages the first MEC application, to request the ME platform to perform configuration for an instance of the first MEC application and associate the created NFP with the first traffic flow rule; and
  the ME platform is configured to:
  receive the configuration request.

* * * * *